United States Patent [19]

Seto

[11] Patent Number: 4,791,516
[45] Date of Patent: Dec. 13, 1988

[54] CLEANING LINER IN A MAGNETIC DISK CARTRIDGE

[75] Inventor: Kunihira Seto, Kanagawa, Japan

[73] Assignee: Fuji Photo Film Co., Ltd., Kanagawa, Japan

[21] Appl. No.: 920,496

[22] Filed: Oct. 20, 1986

[30] Foreign Application Priority Data

Oct. 19, 1985 [JP] Japan .............................. 60-159623[U]

[51] Int. Cl.⁴ ............................................. G11B 23/03
[52] U.S. Cl. ...................................... 360/133; 360/137
[58] Field of Search ................. 360/133, 137; 206/444

[56] References Cited

U.S. PATENT DOCUMENTS 4,251,843 2/1981 Masuyama .................... 360/133 X

FOREIGN PATENT DOCUMENTS 2556919 6/1976 Fed. Rep. of Germany ...... 360/133

Primary Examiner—A. J. Heinz
Attorney, Agent, or Firm—Sughrue, Mion, Zinn, Macpeak & Seas

[57] ABSTRACT

A magnetic disk cartridge in which liners located between the cartridge and the rotating disk sheet in order to clean the disk sheet. According to the invention, the percentage of binder in the unwoven cloth varies with the largest percentage being at the surface confronting the disk sheet.

8 Claims, 1 Drawing Sheet

CLEANING LINER IN A MAGNETIC DISK CARTRIDGE

BACKGROUND OF THE INVENTION

1. Field of the Invention

This invention relates to a magnetic disk cartridge in which a disk-shaped thin magnetic recording medium, namely, a magnetic disk sheet, is rotatably supported. The invention relates more particularly to a magnetic disk cartridge having an improved cleaning liner which is brought into contact with the surface of the sheet to clean and protect the surface of the sheet.

2. Background Art

In general, writing data on the magnetic disk sheet or reading data out of the disk sheet is carried out by slidably moving the writing head or reading head radially of the sheet which is being rotated. Therefore, if, in writing data into the magnetic disk sheet or reading data out of the magnetic disk sheet, dust, foreign matter or other particles are on the surface of the magnetic disk sheet, then the data are erroneously written on the magnetic sheet or read out of the disk sheet. That is, so-called "dropout" occurs. This difficulty is very serious because the magnetic disk cartridge is employed mainly as the digital data memory of a computer or the like.

Accordingly, the enclosing case of a conventional magnetic disk cartridge is made of relatively flexible pressed paper or synthetic resin or hardened synthetic resin, and an opening is provided into the case having a dust-proof shutter. Furthermore, a cleaning liner is provided on the inner wall of the case in such a manner that the liner is in light contact with the recording surface of the magnetic disk sheet. The liner acts to wipe the dust off the surface of the magnetic disk sheet which is being rotated. That is, the liner is used to clean the surface of the magnetic disk sheet.

The liner is made of unwoven cloth of rayon fibers and polypropylene or polyester compound fibers. However, the unwoven cloth suffers from the following difficulties.

When the unwoven cloth is manufactured, fiber pellets are formed by thermal fusion. When the unwoven cloth is torn or trapped, fine particles, such as fibers, are scattered from the unwoven cloth. Furthermore, when the liner is set between the upper half and the lower half in order to weld the upper and lower halves together by ultrasonic welding to form a magnetic disk cartridge, or when vibration or impact is applied to a magnetic disk cartridge in various manners, pellets of polypropylene or the like fall on the surface of the magnetic disk sheet and enter the head gap or rub the surface of the magnetic disk sheet. As a result, the pellets or the like cause temporary or permanent dropout.

In order to eliminate this difficulty, a method has been employed in which binder is applied to the liner to increase the strength of the surfaces of the liner. The method suffers from the difficulties that, as the binder is uniformly applied to the entire liner, the cushioning characteristic of the liner is worsened, and accordingly so is the cleaning characteristic.

SUMMARY OF THE INVENTION

In view of the foregoing, an object of this invention is to provide a magnetic disk cartridge with liners in which separation of pellets or the like and scattering of particles such as dust are prevented.

Another object of the invention is to improve the cushioning characteristics of the liner. By means of these improvements, the magnetic disk sheet is effectively cleaned at all times.

The foregoing objects of the invention have been achieved by the provision of a magnetic disk cartridge comprising a case, a magnetic disk sheet rotatable within the case, and cleaning liners arranged between the magnetic disk sheet and the upper and lower inner walls of the case. According to the invention, each liner is made of unwoven cloth, and contains binder in such a manner that the surface confronting the magnetic disk sheet has the largest quantity of binder, and the quantity of binder in the liner decreases towards the inside of the liner.

DETAILED DESCRIPTION OF THE PREFERRED EMBODIMENTS

A preferred embodiment of this invention will be described in detail with reference to the accompanying drawing.

Figure 1:
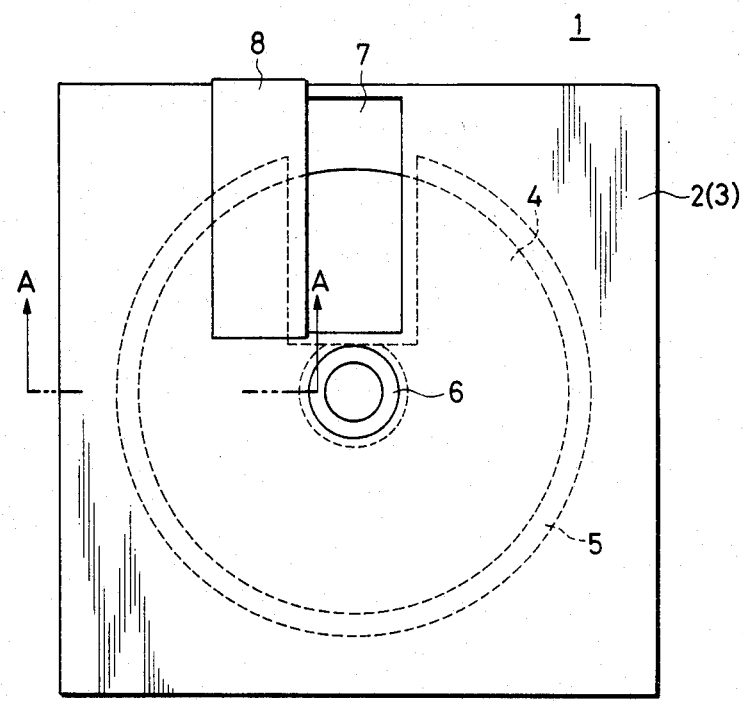
FIG. 1 is a plan view outlining a magnetic disk cartridge which is one embodiment of this invention.
Figure 2:
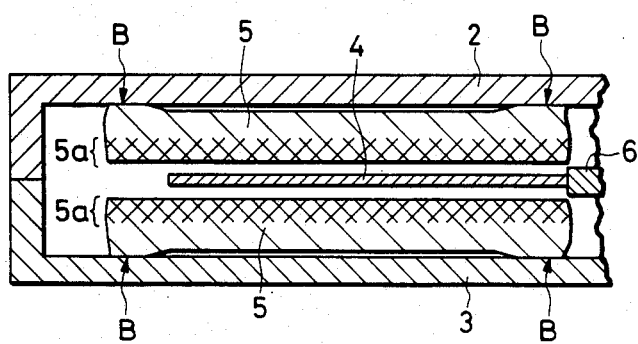
FIG. 2 is an enlarged sectional view taken along line A—A in FIG. 1.

FIG. 1 is a plan view outlining a magnetic disk cartridge of the preferred embodiment of the invention, and FIG. 2 is an enlarged sectional view taken along line A—A in FIG. 1.

The magnetic disk cartridge 1, as shown in FIG. 1, comprises an upper half 2 and a lower half 3 of the case which are made of relatively hard plastic resin. These halves 2 and 3 form a case which accomodates a magnetic recording medium, namely, a magnetic disk sheet 4. The case also accommodates cleaning liners 5 of unwoven cloth for protecting and cleaning the magnetic sheet 4. The magnetic disk sheet 4 has a center core 6 at the center which is held by rotating drive means (not shown) of a signal recording and reproducing device. The case has a rectangular opening 7 into which a magnetic head is inserted, and a dust-proof slidable shutter 8 for closing the opening 7. Similarly as in a conventional magnetic disk cartridge, lifters are provided between the case and the cleaning liners 5 so that the liners 5 are suitably brought into contact with the surfaces of the sheet 4.

The liners 5 are provided respectively on both sides of the magnetic disk sheet 4, and each of the liners 5 is in the form of a doughnut-shaped disk which can substantially cover the entire recording and reproducing surface of the magnetic disk sheet 4. The liners 5 are thermally welded to the inner walls of the case. More specifically, as shown in FIG. 2, peripheral portions B of each liner 5 are thermally welded to the inner wall of the case. Therefore, the liners 5 are to some extent flexibly in contact with the surfaces of the sheet 4.

In each of the liners 5, its surface confronting the sheet 4 is different from its inside in the quantity of binder. More specifically, each liner 5 is made as a whole of rayon fibers and polypropylene polyester nylon compound fibers. However, the surface confronting the sheet 4 is a layer 5a and this layer has the largest quantity of binder, for instance being 50% (by weight), and the quantity of binder is smaller towards the inside of the liner and the inner wall of the case. That is, the quantity of binder of the surface confronting the inner wall of the case is about 5% (by weight). The sliding characteristic of the liners 5 with respect to the surfaces of the sheet 4 can be improved by impregnating a surface active agent or lubricant.

The binder is comprised of ethylacrylate, SBR (styrene Butudine rubber) and NBR (nitryl rubber). Fibers forming liners 5 are impregnated with a liquid in low concentration of binder, then the liquid deimpregnates. A liquid having high concentration of binder is sprayed onto one or both surfaces of the liners 5, so that one or both surfaces are different from the inside in the quantity of binder.

The liners 5 are formed by thermally fusing compound fibers in the form of a web which is formed by mix-spinning rayon fibers and thermosoftening fibers of polypropylene. However, the liners 5 may be formed by other conventional methods. For instance, a dry-type liner forming method may be used to form the liners. In the dry-type method, fibers arranged in the form of a web or mat are immersed in an adhesive solution, dried and subjected to heat-treatment. Alternatively, a wet type liner forming method according to a paper making system may be employed to form the liners 5.

The conventional binder is applied to the liners 5 of the thus manufactured unwoven cloth, and the liners thus treated are attached to the inner walls of the upper and lower halves 2 and 3 in such a manner that the sides having the largest quantity of binder face outwardly (or towards the magnetic disk sheet 4). Therefore, when vibration or impact is applied to the magnetic disk cartridge during assembling or after assembly, the layers 5a containing a large quantity of binder act to prevent the occurrence of the difficulty that pellets, which are formed when for instance polypropylene is molten, or other particles, such as dust contained in the liners, fall on the surfaces of the magnetic disk sheet. In the layers themselves, pellets are scarcely formed and fewer particles such as dust are contained in the layers. Furthermore, even if the layers slide on the magnetic disk sheet 4 for a long period, so-called "fluffs" are scarcely formed. When the liners 5 thus formed are brought into contact with the magnetic disk sheet 4, no pellets nor particles such as dust fall on the sheet 4, and accordingly such foreign matters will never go into the head gap. Thus, the liners 5 can keep the surfaces of the sheet 4 clean for a long period.

In each of the liners, the quantity of binder is made smaller towards the inside of the liner and the inner wall of the case, so that the inside of the liner is fluffed and the cushioning characteristic is improved. Therefore, the liner is gently brought into contact with the magnetic disk sheet, and the cleaning operation and the sheet protection are effectively carried out.

In the above-described embodiment, each of the liners 5 is so designed that it has a layer in which the quantity of binder is largest and which is confronted with the surface of the magnetic disk sheet. The peripheral portions B of the liner are welded to the inner wall of the case, whereby dispersal of particles such as dust contained in the liner itself is prevented. However, the invention is not limited thereto or thereby. For instance, in manufacturing a liner, the upper and lower surfaces of a piece of unwoven cloth may be formed of layers in both of which the quantity of binder is largest. If the liners thus formed in layers are employed instead of the first described liners, then the difficulty can be prevented that, when the liners 5 are attached to the upper half 2 and the lower half 3, particles such as dust contained in the liners 5 are scattered to stick to the inner walls of the case.

Furthermore, if the edge of each of the liners 5 is thermally sealed, then falling of pellets from the edge can be prevented.

In the above-described embodiment, the case of the magnetic disk is made of hard material. However, it should be noted that the invention is not limited thereto or thereby. That is, the technical concept of the invention can be applied to various floppy disks or the like.

As was described above, in each of the liners 5 according to the invention, the surface confronted with the magnetic disk sheet 4 is the layer in which the quantity of binder is largest. Therefore, dispersal of pellets or the like in the fibers onto the magnetic disk sheet 4 is prevented. Accordingly, the occurrence of the dropout caused by the liners 5 is prevented, and the liners 5 maintain excellent cushioning characteristics.

That is, according to the invention, employment of the liners 5 prevents the formation of pellets or scattering of dust and provides a magnetic disk cartridge in which the surfaces of the magnetic disk sheet can be maintained clean and protected from damage for a long period.

What is claimed is:

1. A magnetic disk cartridge, comprising:
   a case having an internal space;
   a magnetic disk sheet rotatable within said internal space; and
   liners located in said internal space between upper and lower inner walls of said case and said disk sheet for cleaning said disk sheet, wherein each liner comprises unwoven cloth containing a binder, said binder forming a greater percentage of the total material composition of said liner quantity at a surface of said liner confronting said disk sheet and a lesser percentage towards an interior of said liner.

2. A magnetic disk cartridge as recited in claim 1, wherein said liner is welded to one of said inner walls along a peripheral portion of said liner.

3. A magnetic disk sheet as recited in claim 1, wherein a compositional percentage of the binder at a surface of said liner facing away from said disk sheet is higher than a compositional percentage of the binder at said interior of said liner.

4. A magnetic disk cartridge as recited in claim 1, wherein said unwoven cloth comprises rayon fibers thermally fused with polypropylene nylon compound fibers.

5. A magnetic disk cartridge as recited in claim 1, wherein a compositional percentage of the binder at a surface of said liner facing away from said disk sheet is less than a compositional percentage of the binder at said surface facing said disk sheet.

6. A magnetic disk cartridge as recited in claim 5, wherein said unwoven cloth comprises rayon fibes therm fused with polypropylene nylon compound fibers.

7. A magnetic disk cartridge as recited in claim 6, wherein compositional percentage of the binder at said surface facing said disk sheet is approximately 50% (by weight based on the total weight of the unwoven cloth and binder) and at said surface facing away from said disk sheet is approximately 5% (by weight based on the total weight of the unwoven cloth and binder).

8. A magnetic disk cartridge as recited in claim 7, wherein said liner is welded to one of said inner walls along a peripheral position of said liner.

* * * * *